United States Patent [19]

Imai et al.

[11] Patent Number: 4,720,867
[45] Date of Patent: Jan. 19, 1988

[54] WOOFER SYSTEM FOR AN AUTOMOTIVE AUDIO SYSTEM WITH A PROTECTER THEREFOR

[75] Inventors: Hiroshi Imai; Takayuki Yanagishima; Junichi Kasai, all of Yokosuka, Japan

[73] Assignee: Nissan Motor Company, Limited, Japan

[21] Appl. No.: 628,604

[22] Filed: Jul. 6, 1984

[30] Foreign Application Priority Data

Jul. 30, 1983 [JP] Japan .................................. 58-139875

[51] Int. Cl.$^4$ .............................................. H04R 7/04
[52] U.S. Cl. ...................................... 381/86; 381/152; 381/189
[58] Field of Search ...................... 381/86, 88, 90, 152, 381/189; 181/141, 150, 175; 179/115.5 R

[56] References Cited

U.S. PATENT DOCUMENTS 4,354,067 10/1982 Yamada et al. ........... 179/115.5 R X
4,499,340 2/1985 Kasai et al. ..................... 381/86 X

OTHER PUBLICATIONS

Lafayette catalog, 1977 catalog 770, p. 45.
Montgomery Ward catalog, Fall 1981, p. 701, "Jensen Triax Speakers".

Primary Examiner—James L. Dwyer
Attorney, Agent, or Firm—Lane and Aitken

[57] ABSTRACT

A woofer system for an automotive audio system is provided with a protective cover extending over a section of a vehicle panel which both forms part of a vehicle body and serves as a speaker diaphragm producing acoustic vibrations at audio frequencies. The cover is in a spaced-apart relationship with said section so as not to interfere with oscillation of the section of the vehicle panel while it is oscillating at audio frequencies. The cover has a support extending toward the vehicle panel and surrounding the section. The support is formed with at least one opening for transmitting acoustic vibrations produced by oscillation of the section of the vehicle panel.

16 Claims, 11 Drawing Figures

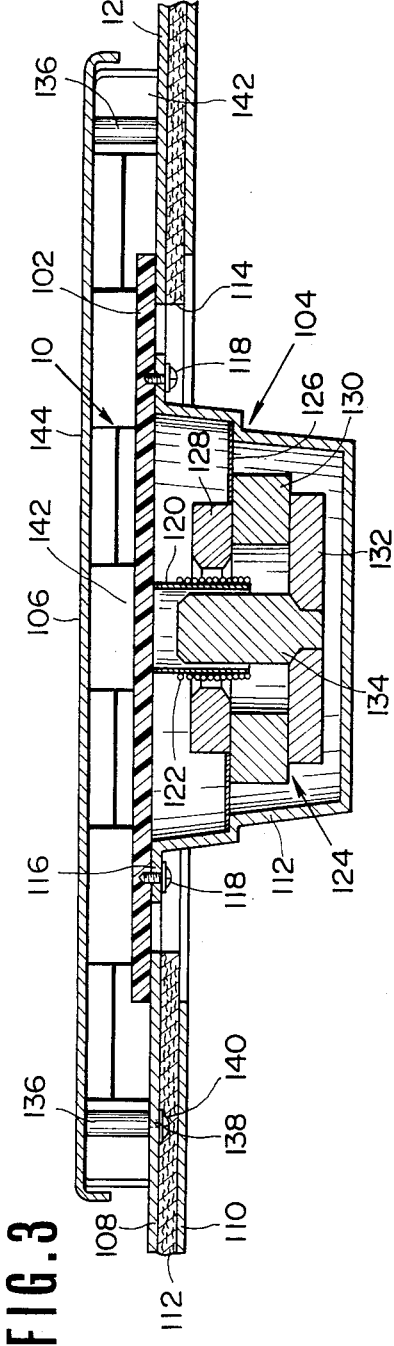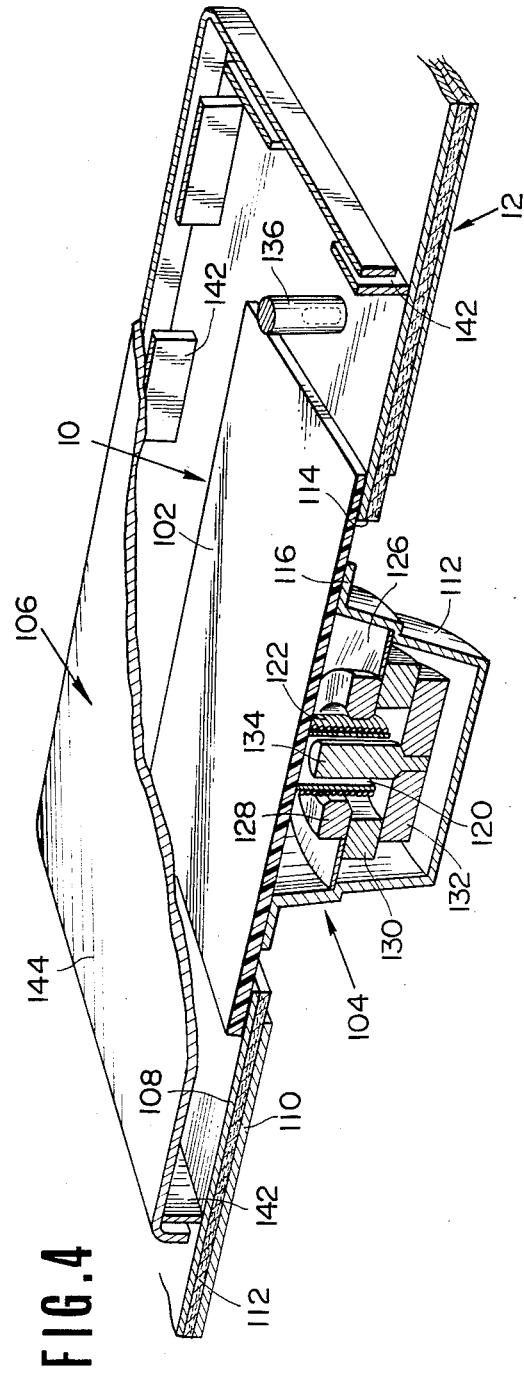

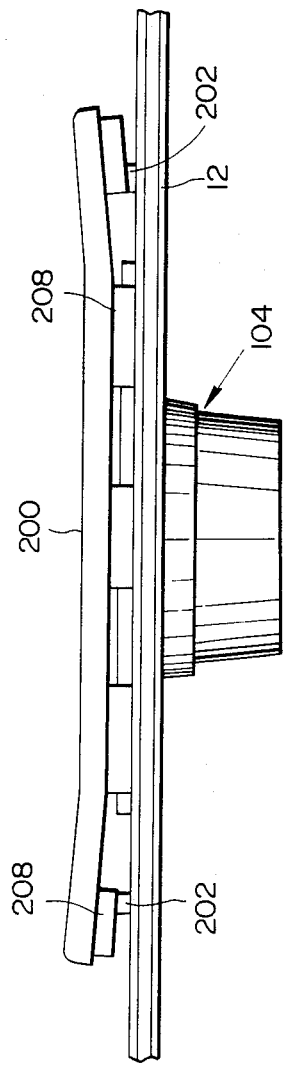
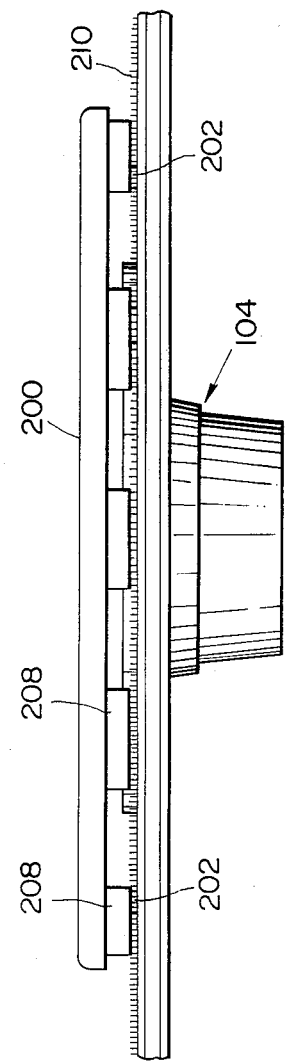

WOOFER SYSTEM FOR AN AUTOMOTIVE AUDIO SYSTEM WITH A PROTECTER THEREFOR

BACKGROUND OF THE INVENTION

The present invention relates generally to a woofer system for an automotive audio system, which woofer includes a portion of vehicle panel serving as sound-generating diaphragm. More particularly, the invention relates to a protector for the portion of a vehicle panel serving as the sound-creating diaphragm of the woofer.

The co-pending U.S. patent application Ser. No. 329,875, filed on Dec. 11, 1981, by Takayuki YANAGISHIMA et al. and assigned to the common assignee, now abandoned, discloses a woofer for an automotive audio system. The disclosed woofer incorporates a portion of a vehicle panel adapted to be driven by a driver to create relatively low-frequency audio sound. Such a woofer may be installed on a rear parcel shelf or in a door trim.

When the woofer is installed on the rear parcel shelf, the vehicle panel forming the rear parcel shelf may be loaded to oscillate at audio frequencies. As long as nothing is put on the rear parcel shelf, the woofer can output bass frequencies at an adequate volume. However, if passenger luggage or the like is put on the rear parcel shelf, the weight of the luggage may prevent the panel from oscillating or from oscillating at a sufficiently high amplitude to produce adequate base volume. When the luggage is put directly on the woofer, the quality of sound from the woofer will be especially adversely affected.

SUMMARY OF THE INVENTION

Therefore, it is an object of the present invention to provide a woofer system with a protector which satisfactorily resolves the aforementioned drawback in the prior invention.

Another and more specific object of the invention is to provide a protective cover for a woofer, which cover covers the portion of a vehicle panel serving as a sound-creating diaphragm of the woofer.

A further object of the invention is to provide a protective cover for a woofer, which cover does not interfere with oscillation of a vehicle panel even when inert loads, such as the passenger luggage, are applied thereto.

A still further object of the invention is to provide a protective cover for a woofer, which cover is satisfactorily and successfully prevented from creating any chattering sound which might otherwise be created due to relative vibrations of the vehicl panel and the cover.

In order to accomplish the above-mentioned and other objects, a woofer system for an automotive audio system according to the present invention is provided with a protective cover extending over a section of vehicle panel which both forms a part of vehicle body and serves as a speaker diaphragm producing acoustic vibrations at audio frequencies. The cover is installed in a spaced-apart relationship with said section so as not to interfere with oscillation of the vehicle panel. The cover has a support extending toward the vehicle panel and surrounding the section. The support has at least one opening for transmitting acoustic vibrations produced by oscillation of the section of the vehicle panel.

Preferably, the support is slightly shorter than the distance between opposing parallel sections of the vehicle panel and the cover to define a clearance between the edge of the support and the surface of the vehicle panel. In an additional preferred construction, a reinforcement prevents the cone from coming into contact with the surface of the vehicl panel at points other than the support.

BRIEF DESCRIPTION OF THE DDRAWINGS

The present invention will be understood more fully from the detailed description given herebelow and from the accompanying drawings of the preferred embodiments of the invention, which, however, should not be taken to limit the inventin to the specific embodiments but are for understanding and explanation only.

In the drawings:

FIG. 3 is a cross-section taken along line III—III of FIG. 2, and showing of the preferred embodiment of woofer according to the present invention in cross-section;

FIG. 4 is a cut-away perspective view of the woofer of FIG. 3;

FIG. 7 is a view similar of FIG. 6 showing the cover member under a static load;

FIG. 8 is a view similar to FIG. 5 but showing a further modification of the preferred embodiment of woofer of FIG. 5;

DESCRIPTION OF THE PREFERRED EMBODIMENT

Figure 1:
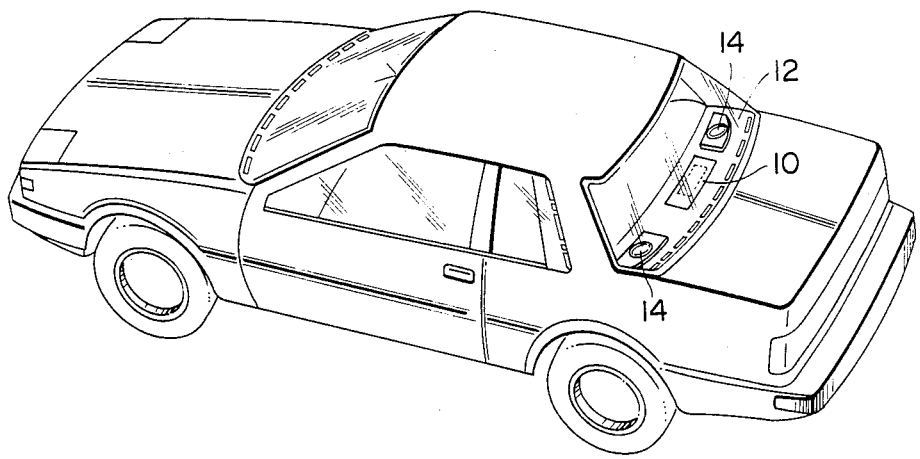
FIG. 1 is an illustration of an automotive vehicle in which the preferred embodiment of woofer according to the present invention is to be mounted.
Figure 2:
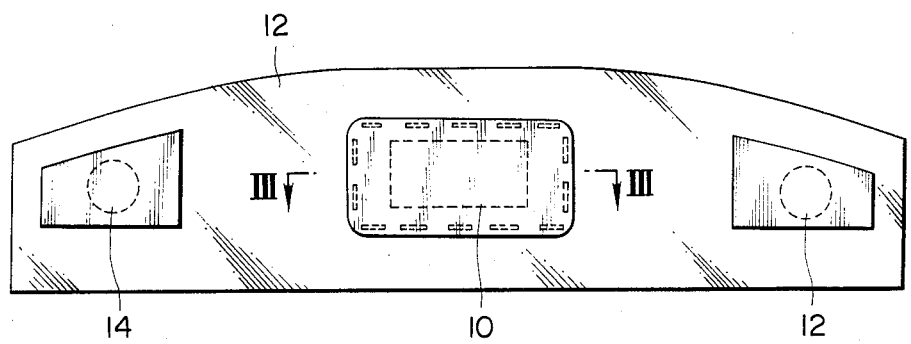
FIG. 2 is a plan view of a rear parcel shelf of the vehicle of FIG. 1, showing the speaker arrangement in the automotive audio system.

Before disclosing the present invention in terms of the preferred embodiment of the present invention, the co-pending related applications are listed below;

U.S. patent application Ser. No. 582,143 filed Feb. 24, 1984, now U.S. Pat. No. 4,514,599, issued Apr. 30, 1985, which is a continuation application of Ser. No. 329,875, filed Dec. 11, 1981 and now abandoned; U.S. patent application Ser. No. 491,292, filed May 3, 1983, now U.S. Pat. No. 4,551,849, issued Nov. 5, 1985, and U.S. patent application Ser. No. 500,573, filed June 2, 1983 now U.S. Pat. No. 4,550,428, issued Oct. 29, 1985, are mutually related co-pending applications and all disclose woofers utilizing vehicle panels as speaker diaphragms. The contents of the above-listed co-pending applications are hereby incorporated by reference for the sake of disclosure.

Now referring to the drawings, particularly FIGS. 1 through 4, an automotive vehicle has a rear parcel shelf 12. Speakers 10 and 14 are arranged on the rear parcel shelf. The speaker 10 located near the center of the rear parcel shelf is the preferred embodiment of a woofer according to the present invention. The speakers 14 located to either side of woofer 10 are conventional cone-type speakers. The speakers 14 may be adapted to reproduce mid-range and high-frequency audio sounds and thus may be mid-range speakers, tweeters or a combination of mid-range speakers and tweeters.

The speaker 10 has an essentially rectangular panel member 102 which forms part of the rear parcel shelf 12. The panel member 102 is associated with a driver unit 104, to be described later, which drives the panel member 102 at audio frequencies to reproduce audio sounds in the relatively low frequency range. A cover member 106 covers the speaker 10. The cover member 106 protects the speaker 10, and especially the panel member 102, from loads such as luggage or the like put on the rear parcel so as to allow free oscillation thereof.

FIGS. 3 and 4 show detail of the preferred embodiment of woofer 10 according to the present invention. The panel member 102 is mounted on a rear parcel shelf outer panel 108 which forms the rear parcel shelf 12 in conjunction with a rear parcel shelf inner panel 110 and a layer of nonwoven material 111 such as felt sandwiched between the outer and inner panels 108 and 110. The panel member 102 is tightly secured to the outer panel 108 for transmitting audio frequency oscillations to the rest of the rear parcel shelf 12 to cause same to oscillate in the low-frequency audio range.

The driver unit 104 has a casing 112 of generally cup-shaped configuration. The casing 112 is suspended in a through opening 114 formed in the central portion of the rear parcel shelf 12 from the lower surface of the panel member 102, to which a top flange 116 is secured by means of a plurality of fastener screws 118. A cylindrical coil support 120 extends downwardly from the panel member 102. A magnetic coil 122 is wound around the coil support 120. The magnetic coil 122 is connected to the audio player unit (not shown), such as a cassette tape player, in a per se well known manner.

A driver assembly 124 is suspended in the casing 112 by means of a resilient member 126. The driver assembly 124 comprises an annular yoke plate 128, an annular magnet 130, a yoke plate 132 and a pole piece 134 extending from the yoke plate 132. The pole piece 134 exteends into the interior of the coil support. The annular yoke plate 128 and the magnet 130 surround the magnetic coil and cause oscillation of the panel member 102 and the coil support 120 according to energization and deenergization of the magnetic coil.

Although a specific configuration of the driver assembly is illustrated above to exemplify the preferred embodiment of the present invention, the structureion of the driver unit and the woofer are not limited to those shown. For example, the aforementioned co-pending U.S. patent application Ser. Nos. 582,143, 491,292, 491,293 and 500,573 disclose various woofer structures to which the preferred embodiment of the present invention is applicable. Therefore, the invention has not to be limited to the specific configuration described above.

The cover member 106 extends over the panel member 102 and protects the latter from being subjected to loads as mentioned above. The cover member 106 has a plurality of bosses 136 extending from its lower surface. The lower end of each boss contacts the upper surface of the rear parcel shelf outer panel 108 and is aligned coaxially with a corresponding through opening 138 formed in the rear parcel shelf outer panel 108. A fastener screw 140 extends through the opening 138 and engages the boss to secure the cover member 106 to the upper surface of the panel 108. The cover member 106 also has a plurality of legs 142 extending perpendicularly to its major section 144 which lies essentially parallel to the panel member 102. The legs 142 are arranged around the circumferential edge of the panel member 102. The circumferential edge 146 of the major section 146 is bent to form a rim 148 essentially parallel to the legs 142. The lower edges of the legs 142 normally rest in contact with the upper surface of the outer panel 108.

In this structure, the major section 144 is positioned above the panel member 102 in a spaced-apart relationship in order not to interfere with oscillation of the panel member when the latter is driven by audio signal from the audio player. The cover member should be rigid enough to resist bending stresses applied thereto when supporting luggage and so forth. Therefore, the cover member 106 prevents the panel member 102 from being loaded, thus preventing distortion of the audio sound and assuring high-quality bass sound.

Figure 5:
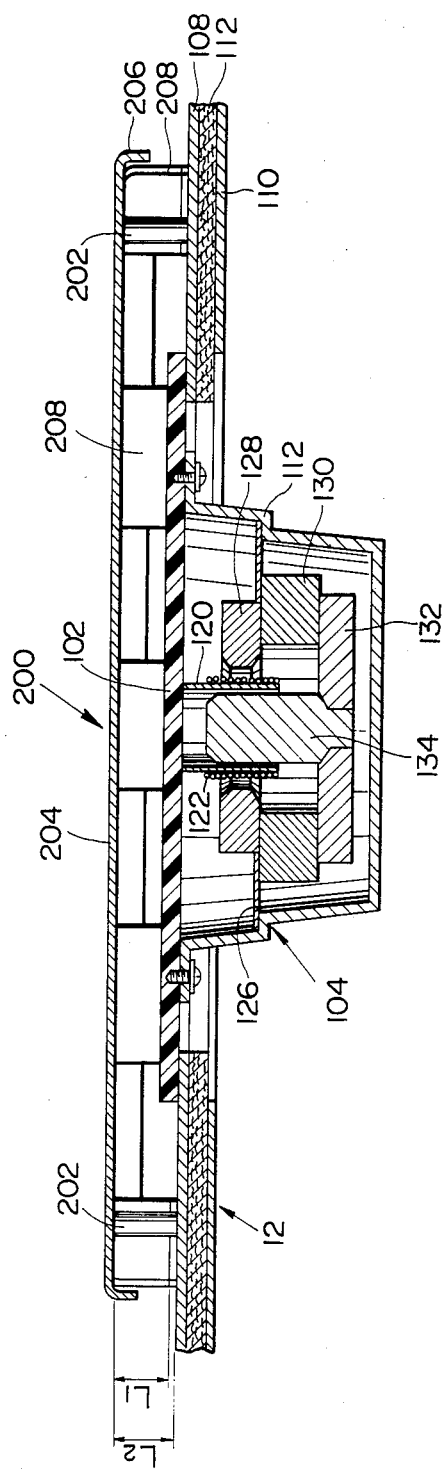
FIG. 5 is a view similar to FIG. 3 of a modification of the preferred embodiment of the woofer of the present invention.
Figure 6:
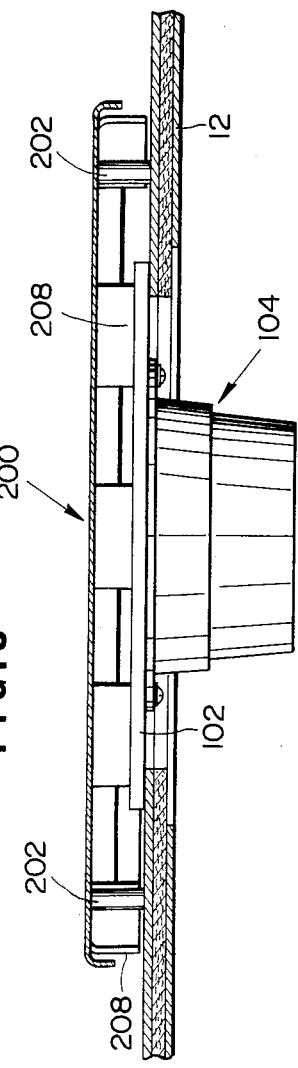
FIG. 6 is an elevation of the woofer of FIG. 5.

FIGS. 5-7 show a modification of the aforementioned preferred embodiment of the woofer according to the present invention. The driver unit 104 is substantially the same as in the foregoing. Therefore, in order to avoid unnecessary repetition and to simplify the disclosure, detailed description of the driver unit 104 will be omitted.

In this modification, a cover member 200 has a plurality of cylindrical bosses 202 extending from the lower surface of its major section 204. The bosses 202 are designed to come into contact with the upper surface of the rear parcel shelf outer panel 108 at points near the peripheral edge of the panel member 102 which is adapted to oscillate at the low end of the audio frequency range. The peripheral edge 206 of the major section 204 is turned perpendicular to the plane of the major section.

Legs extend from the lower surface of the major section essentially parallel to the peripheral edge 206 of the major section 204. The legs are arranged around the peripheral edge 206. Each leg of length L1 is slightly shorter than the boss of length L2. Therefore, when the cover member is secured over the panel member 102 by means of fastener screws engaging the bosses, the lower end of the legs 208 oppose the outer surface of the rear parcel shelf outer panel 108 with a small clearance. This clearance allows the rear parcel shelf 12 to oscillate in synchronism withthe oscillation of the panel member 102 in order to create acoustic vibrations reproducing the low-frequency audio range. Therefore, the clearance has to be sufficient to prevent contact between the outer surface of the parcel shelf outer panel 108 and the legs while the rear parcel shelf is oscillating in response to energy transmitted through the panel member 102 which is, in turn, driven at relatively low audio frequencies. The clearance, on the other hand, has to be narrow enough to allow the lower end of the legs 208 to contact the outer surace of the outer panel 108 when the major section 204 is deformed by loads such as luggage, as shown in FIG. 7. Abutment of the lower ends of the legs 208 onto the outer surface of the outer panel 108 limits deformation of the major section 204 to the range corresponding to the clearance between the lower ends of the legs and the outer surface of the outer panel 108.

The cover member 200 with this modified structure prevents the woofer output from being distorted, as the cover member cannot come into contact with the outer surface of the outer panel 108. Furthermore, since the outer panel 108 is coupled to the cover member at only a few points, even when some load is applied to the cover member, the rear parcel shelf itself may vibrate at substantially the same frequency as that of the oscillation of the panel member 102. Vibration of the entire rear parcel shelf boosted the amplitude of the acoustic vibrations. As a result, the quality of low-frequency or bass sound is greatly enhanced. In addition, the boost to the low-frequncy sound due to oscillation of the parcel shelf itself helps to ensure a sufficient sound level for good quality sound reproduction in combination with the tweeter and/or midrange speakers.

On the other hand, even when relatively heavy luggage is set on the panel member 102 so that the legs abut the outer surface of the outer panel 108, thus restricting deformation of the cover member, the panel member 102 is satisfactorily and successfully guarded against interference with its vibration. As a result, high-quality bass sound at an adequate amplitude can be enjoyed even when luggage is set onto the woofer.

FIG. 8 shows a further modification of the aforementioned modification of FIG. 5. In this modification, a pile layer 210 is provided on the outer surface of the outer panel 108. The thickness of the pile layer 210 essentially corresponds to the clearance between the lower end of the legs 208 and the outer surface of the outer panel 108. Therefore, the clearance can be masked by the pile layer.

The material of the pile layer should be selected to be so flexible that the pile layer will not transmit vibrations from the rear parcel shelf to the cover member and, at the same time, will not transmit loads applied to the cover to the rear parcel shelf.

With this structure, the appearance of the woofer can be substantially and remarkably improved.

Figure 9:
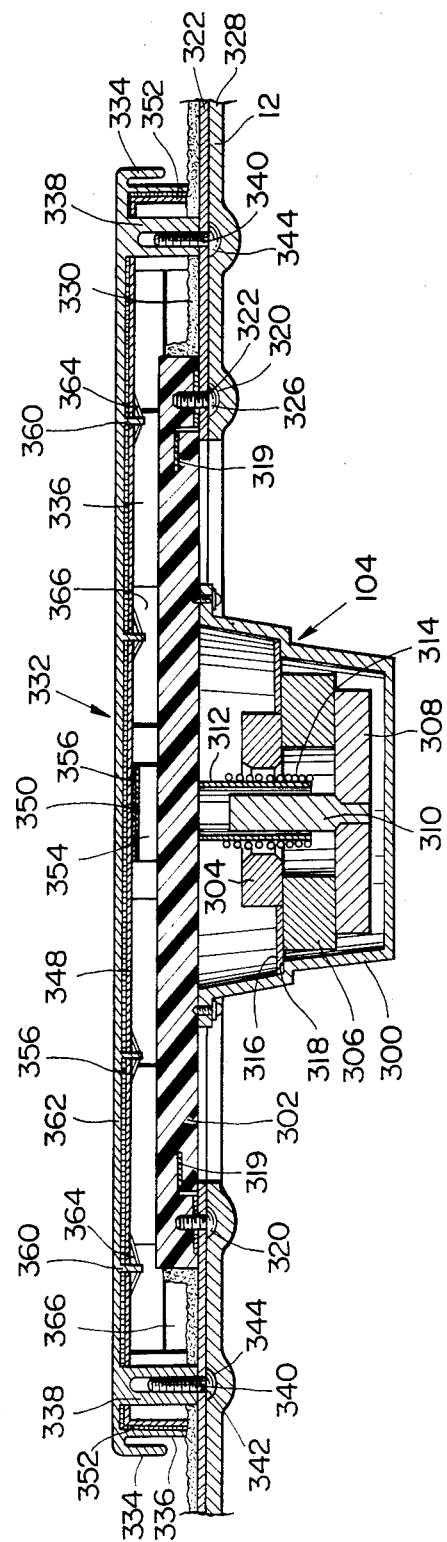
FIG. 9 is a cross-section of another embodiment of a woofer according to the present invention.
Figure 10:
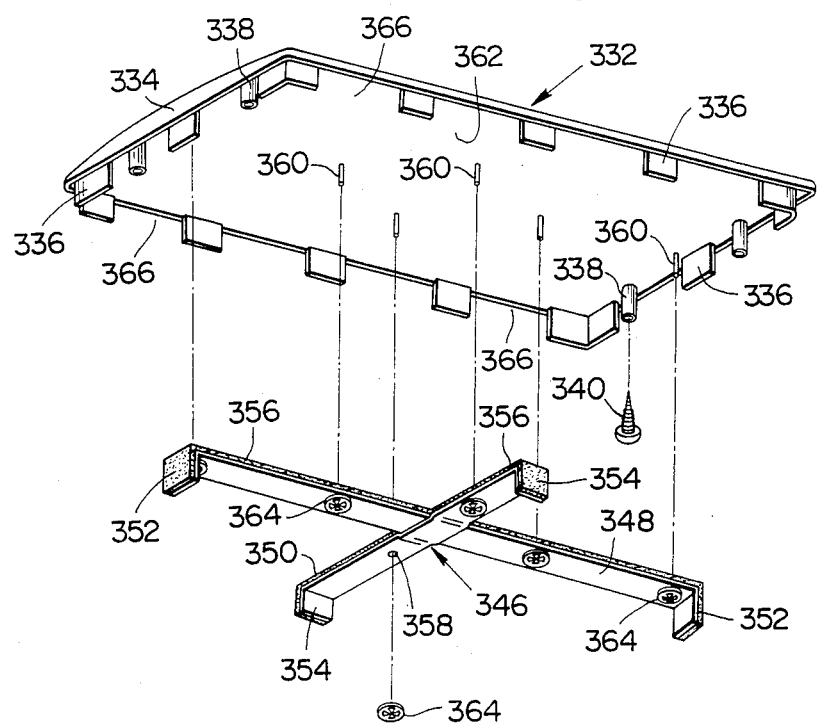
FIG. 10 is an exploded view of the bottom of the cover member used in the woofer of FIG. 9.
Figure 11:
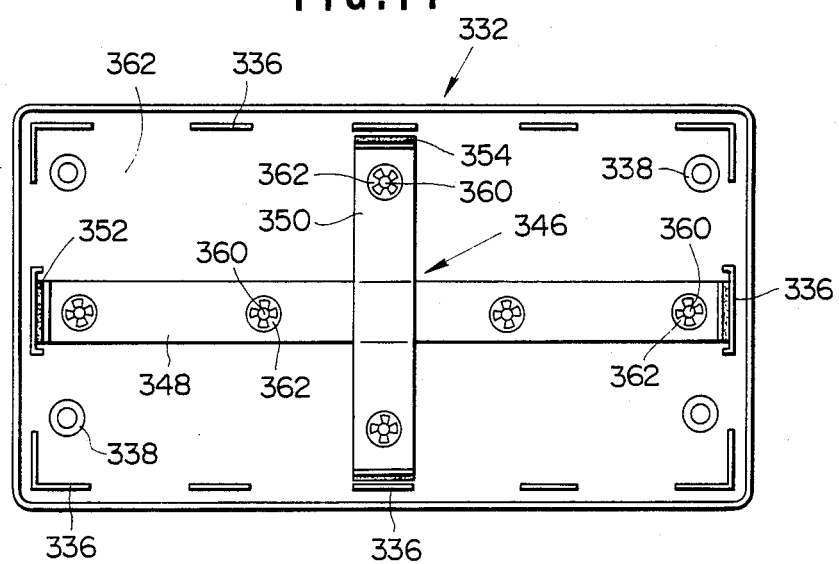
FIG. 11 is a plan view of the bottom of the cover member of FIG. 9.

FIGS. 9 to 11 show another embodiment of woofer according to the present invention. In this embodiment, the structure of the driver unit 104 is essentially the same as in the foregoing first embodiment. Specifically, a housing 300 of the driver unit is rigidly secured on the lower surface of a panel member 302 which constitutes a part of the rear parcel shelf 12 as well as serving as a speaker diaphragm for creating acoustic vibrations when driven at relatively low audio frequencies.

A driver assembly includes an annular yoke plate 304, an annular permanent magnet 306, an essentially disc-shaped yoke plate 308 and a pole piece 310 made of magnetized material with one end inserted into the interior of a cylindrical coil bobbin 312, and the other end anchored in the yoke plate 308. The bobbin 312 extends from the lower surface of the panel member 302 and is surrounded by an electromagnetic coil 314 which is a so-called voice coil connected to the audio player unit (not shown) to receive the audio signal.

The driver assembly is resiliently suspended within the driver housing 300 by means of an annular disc-shaped resilient plate 316 which is secured to the stepped portion 318 of the housing 300 along its outer peripheral edge. The inner peripheral edge portion of the resilient plate 316 is secured to the driver assembly between the yoke plate 304 an the magnet 306.

A crank shaped reinforcement member 319 is built into the panel member 302 around its peripheral edge. The reinforcement member 318 is engageable to a plurality of fastener screws 320 which extend through the rear parcel shelf outer panel 322 through openings 324 formed therein. The head 326 of the fastener screws 320 are hidden by the inner panel 328 attached to the lower surface of the outer panel 322. As can be seen in FIG. 8, a pile layer or unwoven fabric layer 330 is provided on the outer surface of the outer panel 322.

The cover member 332 has a perpendicularly bent peripheral edge 334, legs 336 and bosses 338, similarly to the foregoing embodiment. As can be appreciated from FIGS. 10 and 11, the bosses 338 are disposed near the peripheral edge 334 and separated somewhat from the peripheral edge of the panel member 302. As shown in FIG. 9, the bosses are adapted to abut the outer surface of the outer panel 322 and engage with fastener screws 340 which extend through openings 342 formed in the outer panel. Similarly to the aforementioned fastener screws 320, the heads 344 of the fastener screws 340 are hidden by the inner panel 328.

An essentially cross-shaped reinforcement member 346 is attached to the cover member 332 to reinforce the latter. The reinforcement member 346 comprises a pair of metal strips 348 and 350, each having perpendicularly bent ends 352 and 354. The surfaces of the metal strips 348 and 350 coming into contact with the surface of the cover member 332 are covered with strips 356 of unwoven fiber. The metal strips 348 and 350 also have through openings 358 through which fastening pins 360 extending from the lower surface of the major section 362 of the cover member 332 protrude. Resin clips 364 engage the lower end of the fastening pins 360 to secure the reinforcement member 346 to the lower surface of the cover member 332.

In the assembled state, the ends 352 and 354 fit into the inner surfaces of the legs 336. As shown in FIG. 9, the legs 336 and the ends 352 and 354 of the reinforcement member 346 are generally of equal height and slightly shorter than the bosses 338. Therefore, when the cover member 332 is placed on the outer panel 332, the lower ends of the legs 336 and the ends 352 and 354 move into contact with the pile or unwoven fiber layer 330 but not into contact with the outer surface of the outer panel 322.

With the above-mentioned structure, when the panel member is driven in at relatively low audio frequencies, vibrations are transmitted to the rear parcel shelf through the rigidly connected edges of the panel member. Oscillation of the panel member and the rear parcel shelf generates acoustic vibrations thus reproducing the low-frequency or bass range of audio sound. The acoustic vibrations created by the oscillation of the panel member within the space surrounded by the cover member 332 are transmitted through the openings 366 defined between the legs 336. Therefore, high quality bass sound can be enjoyed.

The reinforcement member 346 attached to the cover member 332 provides greater resistance to static loads so as to prevent the cover member from deforming due to the loads applied thereto. Therefore, even a when relatively great load is applied to the cover member by putting luggage thereon, for example, the woofer of the shown embodiment will produce high quality bass sound. Furthermore, the unwoven fiber layer provided between the reinforcement member 346 and the lower surface of the cover member 332 absorbs vibration transmitted from the rear parcel shelf outer panel to the cover member. Therefore, even though the reinforcement member is secured to the cover member by means of resilient clips, no buzzing or distortion will be produced.

Additionally, in the aforementioned structure in which the reinforcement member is made from metal strips and attached onto the lower surface of the cover member, the overall size, particularly the height, of the woofer can be minimized to facilitate installation in the vehicle.

Therefore, the present invention as set out hereabove satisfactorily and successfully fulfills all of the objects and advantages sought therefor.

It should be noted that, although the specific embodiments have been illustrated in terms of the specific constructions, the invention can be embodied in many ways without departing from the principles of the invention, which may be derived from the appended claims. For example, the invention can be applied to any of the woofer structures disclosed in the co-pending applications identified above. Furthermore, although the disclosure has been directed to a woofer installed in the rear parcel shelf, the position of the woofer of the present invention is not limited thereto but can be located anywhere in the vehicle compartment.

Therefore, it should be clearly pointed out that the invention may include all of possible modification and embodiments which perform substantially the same function as that achieved by the shown embodiments.

What is claimed is:

1. A woofer for an automotive audi system comprising:
   a vehicle panel which forms part of a vehicle body and which is sufficiently flexible to oscillate at audio frequencies, said vehicle panel including a section adapted to oscillate t produce audio sound;
   a driver housing fixed to said section;
   a driver unit resiliently suspended within said housing, associated with an audio player for receiving an audio signal produced by said audio player, and fixed to said section of said vehicle panel to drive said section to oscillate at audio frequencies for producing audio sound, said driver unit comprising a support element secured to said vehicle panel, a coil wrapped around said support element, and a driver assembly having a permanent magnet, positioned adjacent said coil for causing oscillation of said support element; and
   a protective cover mounted on said vehicle panel, having a major section extending over and parallel to said section of said vehicle panel secured to said vehicle panel at a point outside of said section and near said section, said major section having no openings therein for passage of acoustic vibrations generated by said section of said vehicle panel, said major section being separated by a given distance from the rest position of the opposing surface of said vehicle panel, a support extending between said major section near the peripheral edge thereof and said vehicle panel, said support being formed with at least one opening allowing transmission of acoustic vibrations produced by oscillation of said vehicle panel.

2. The woofer as set forth in claim 1, wherein said protective cover is slightly larger than said section so that said support opposes a point on the vehicle panel outside of said section.

3. The cover as set forth in claim 2 wherein said support opposes the opposing surface of said vehicle panel with a given clearance in the rest position of said vehicle panel.

4. The woofer as set forth in claim 3, wherein said clearance between said support andthe opposing surface of said vehicle panel is so chosen that said opposing surface does not come into contact with said support while said vehicle panel is oscillating at audio frequencies.

5. The woofer as set forth in claim 4, wherein said vehicle panel is covered with a fibrous layer on the surface opposing said cover, and the thickness of said layer approximately matches the clearance between said support and said opposing surface.

6. The woofer as set forth in clam 4, which further comprises a reinforcement member attached to said cover for reinforcing the latter, said reinforcement member aiding in preventing said major section of said cover from being deformed to the extent of contacting the opposing surface of said section of said vehicle panel.

7. The woofer as set forth in claim 6, wherein said reinforcement member comprises first and second metal strips arranged perpendicular to each other, and each having ends bent parallel to said support.

8. The woofer as set forth in claim 7, wherein said first and second strips have surfaces mating with the major section and said support of said cover, and a vibration insulating material is applied to said surfaces of said strips for isolating the strips from vibration of the opposing surfaces of said cover.

9. The woofer as set forth in claim 8, wherein said first and second strips are secured to the cover by means of resilient fasteners.

10. The woofer as set forth in claim 9, wherein said vibration insulating material is made of a non-woven vibrous layer attached to said surfaces of said strips.

11. A woofer for an automotive audio system comprising:
    a vehicle panel which forms part of a vehicle body and which is sufficiently flexible to oscillate at audio frequencies, said vehicle panel including a section adapted to oscillate to produce audio sound;
    a driver housing fixed to said section;
    a driver unit resiliently suspended within said housing, associated with an audio player for receiving an audio signal produced by said audio player, and fixed to said section of said vehicle panel to drive said section to oscillate at audio frequencies for producing audio sound, said driver unit comprising a support element secured to said vehicle panel, a coil wrapped around said support element, and a driver assembly having a permanent magnet, positioned adjacent said coil for causing oscillation of said support element; and
    a protective cover having a major plane section extending over said section of said vehicle panel and secured to said vehicle panel at a pont outside of said section and near said section, said major plane section having no openings for the passage of acoustic vibrations generated by said vehicle panel section, said major section being spaced by a given distance fromthe opposing surface of said vehicle panel, a support extending between said major section near the peripheral edge thereof and saidv vehicle panel, and a downward extension extending from the lower surface of said major section, said extension having a lower edge normally positioned spaced from the opposing surface of said vehicle panel and contacting said opposing surface to maintain said major section away from said opposing surface when said major section is deformed, said extension defining at least one opening allowing transmission of acoustic vibrations produced by oscillation of said vehicle panel.

12. The woofer as set forth in claim 11, wherein said vehicle panel is covered with a fibrous layer on the surface opposing said cover, and the thickness of said layer approximately matches the clearance between said extension and said opposing surface.

13. The woofer as set forth in claim 11, wherein said extension comprises first and second metal strips arranged perpendicular to each other, and each having ends bent parallel to said support.

14. The woofer as set forth in claim 13, wherein said first and second strips have surfaces mating with the major section and said support of said cover, and a vibration insulating material is applied to said surfaces of said strips for isolating the strips from vibration of the opposing surfaces of said cover.

15. The woofer as set forth in claim 14, wherein said first and second strips are secured to the cover by means of resilient fasteners.

16. A woofer for an automotive audio system comprising;
 a vehicle panel which forms part of a vehicle body and which is sufficiently flexible to oscillate at audio frequencies, said vehicle panel having an upwardly facing upper surface, and including a section adapted to oscillate to produce audio sound;
 a driver housing fixed to said section;
 a driver unit resiliently suspended within said housing, associated with an audio player for receiving an audio signal produced by said audio player, and fixed to said section of said vehicle panel to drive said section to oscillate at audio frequencies for producing audio sound, said driver unit comprising a support element secured to said vehicle panel, a coil wrapped around said support element, and a driver assembly having a permanent magnet, positioned adjacent said coil for causing oscillation of said support element; and
 a protective cover having a major section extending over and parallel to said section of said vehicle panel and secured to said vehicle panel on said supper surface outside of said section and near said section, said major section having no openings for the passage of acoustic vibrations from said vehicle panel section, said major section being separated by a given distance from the rest postion of the opposing surface of said vehicle panel, a support extending between said major section near the peripheral edge thereof and said upper surface, said support being formed with at least one opening allowing transmission of acoustic vibrations produced by oscillation of said vehicle panel.

* * * * *